United States Patent
Reed

(10) Patent No.: US 11,591,124 B2
(45) Date of Patent: *Feb. 28, 2023

(54) FRUIT TRAY NESTING DEVICE AND METHODS OF USE

(71) Applicant: Packline Technologies, INC., Kingsburg, CA (US)

(72) Inventor: Lorin Reed, Kingsburg, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,209

(22) Filed: Mar. 11, 2022

(65) Prior Publication Data

US 2022/0204202 A1 Jun. 30, 2022

Related U.S. Application Data

(63) Continuation of application No. 16/953,192, filed on Nov. 19, 2020, now Pat. No. 11,319,099.

(60) Provisional application No. 62/937,744, filed on Nov. 19, 2019.

(51) Int. Cl.
| | |
|---|---|
| *B65B 43/52* | (2006.01) |
| *B65B 25/04* | (2006.01) |
| *B65G 13/00* | (2006.01) |
| *B65G 11/02* | (2006.01) |
| *B65G 11/10* | (2006.01) |

(52) U.S. Cl.
CPC ............ *B65B 43/52* (2013.01); *B65B 25/04* (2013.01); *B65G 11/023* (2013.01); *B65G 11/103* (2013.01); *B65G 13/00* (2013.01); *B65B 25/046* (2013.01); *B65B 2220/16* (2013.01)

(58) Field of Classification Search
CPC ....... B65B 43/52; B65B 25/04; B65B 25/046; B65B 2220/16; B65G 13/00
See application file for complete search history.

(56) References Cited

U.S. PATENT DOCUMENTS

| | | | |
|---|---|---|---|
| 2,393,099 | A | 1/1946 | Friday |
| 2,797,540 | A | 7/1957 | Carlsen et al. |
| 3,587,674 | A | 6/1971 | Adkin |
| 3,590,551 | A | 7/1971 | Riddington et al. |
| 3,609,938 | A | 10/1971 | Paddock |
| 3,765,149 | A | 10/1973 | Warkentin |
| 4,149,355 | A | 4/1979 | Clegg |
| 4,305,691 | A | 12/1981 | Mayer |
| 4,329,831 | A | 5/1982 | Warkentin et al. |
| 4,584,821 | A | 4/1986 | Booth |
| 5,876,180 | A | 3/1999 | Sims |
| 6,401,434 | B1 | 6/2002 | Sims |
| 2015/0353212 | A1 | 12/2015 | Williamson |

FOREIGN PATENT DOCUMENTS

| | | | | |
|---|---|---|---|---|
| CA | 2303620 | * | 6/2001 | ............... B65B 5/08 |
| EP | 1972557 | | 9/2008 | |
| EP | 1972559 | | 9/2008 | |

* cited by examiner

*Primary Examiner* — James R Bidwell
(74) *Attorney, Agent, or Firm* — Sierra IP Law, PC; William K. Nelson

(57) ABSTRACT

The present invention provides devices, systems and methods for reliably inserting packing trays into packing crates. Thus, the present invention solves the problems of conventional packaging lines by providing a positioning device for depositing packing trays into packing crates. Particularly, the present invention can be incorporated into existing fruit and vegetable packing lines.

21 Claims, 7 Drawing Sheets

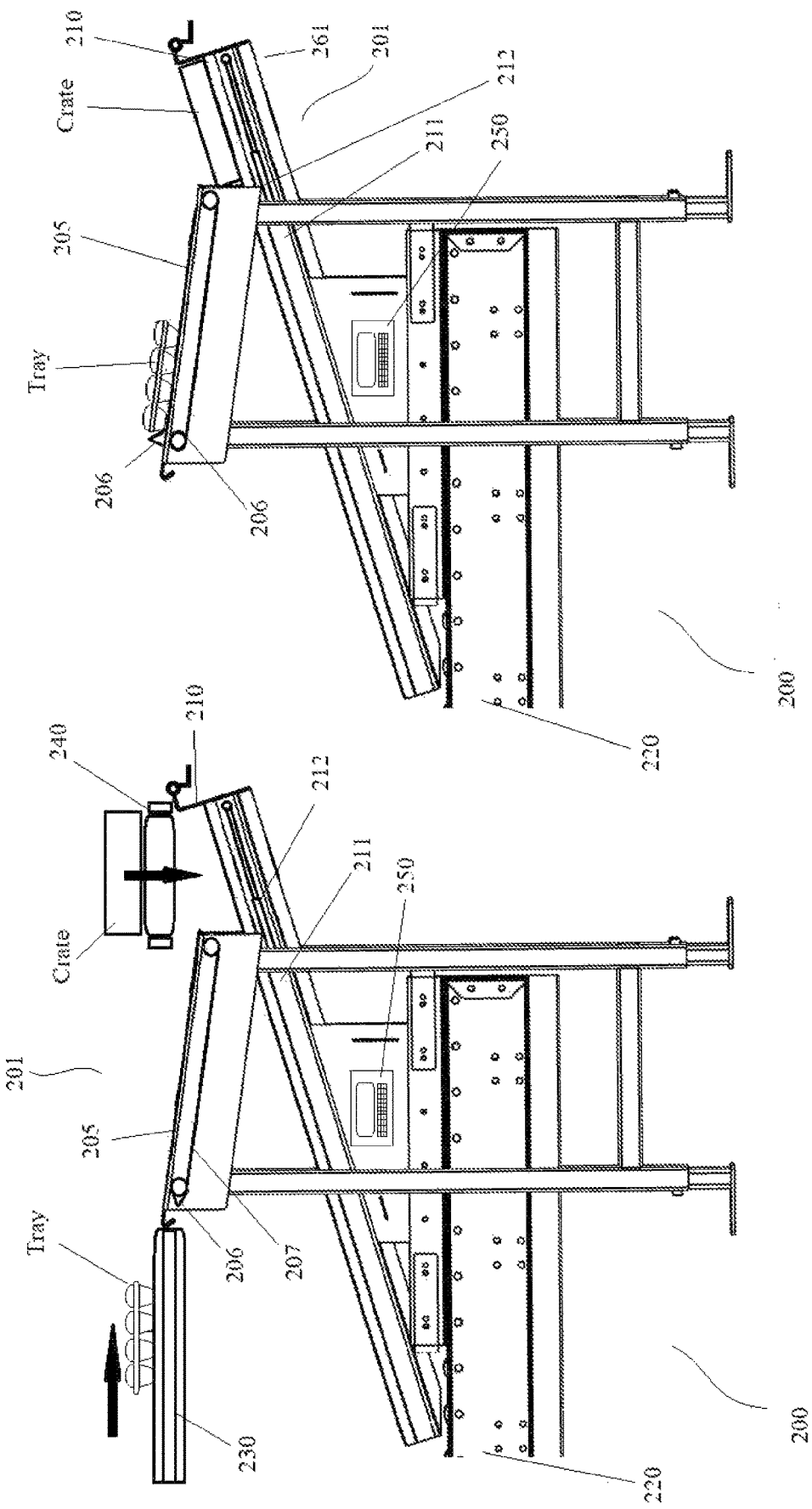

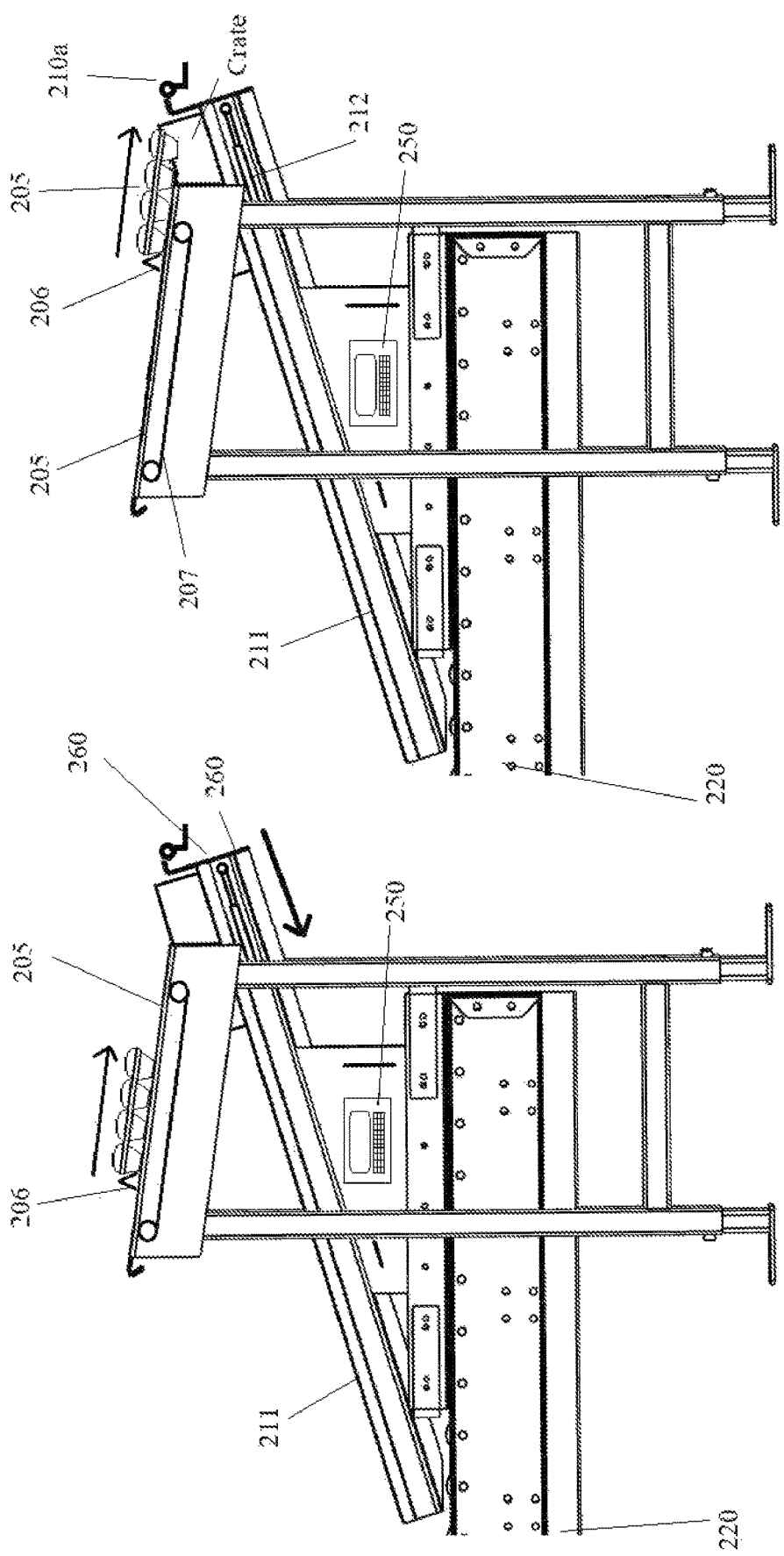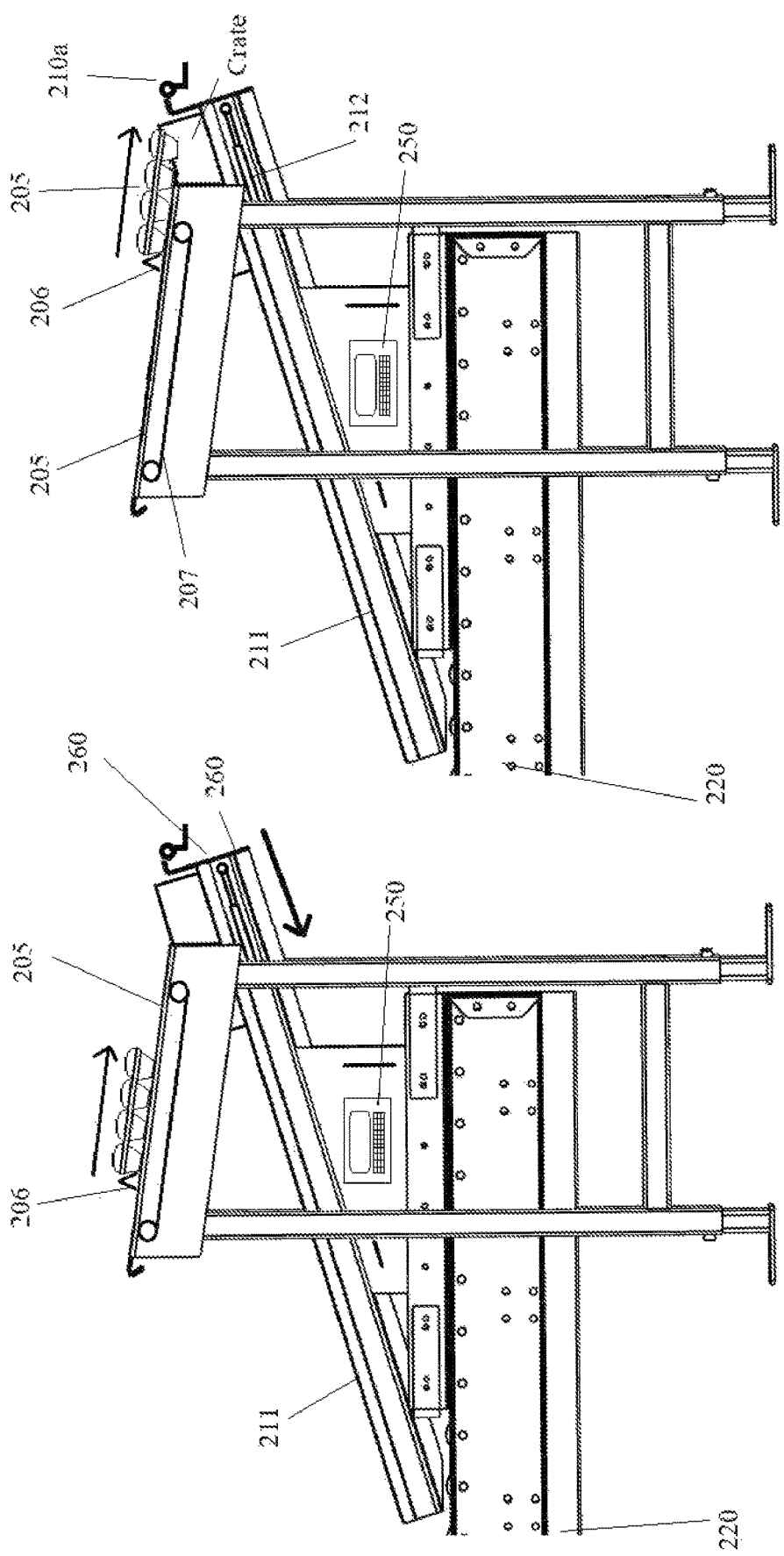

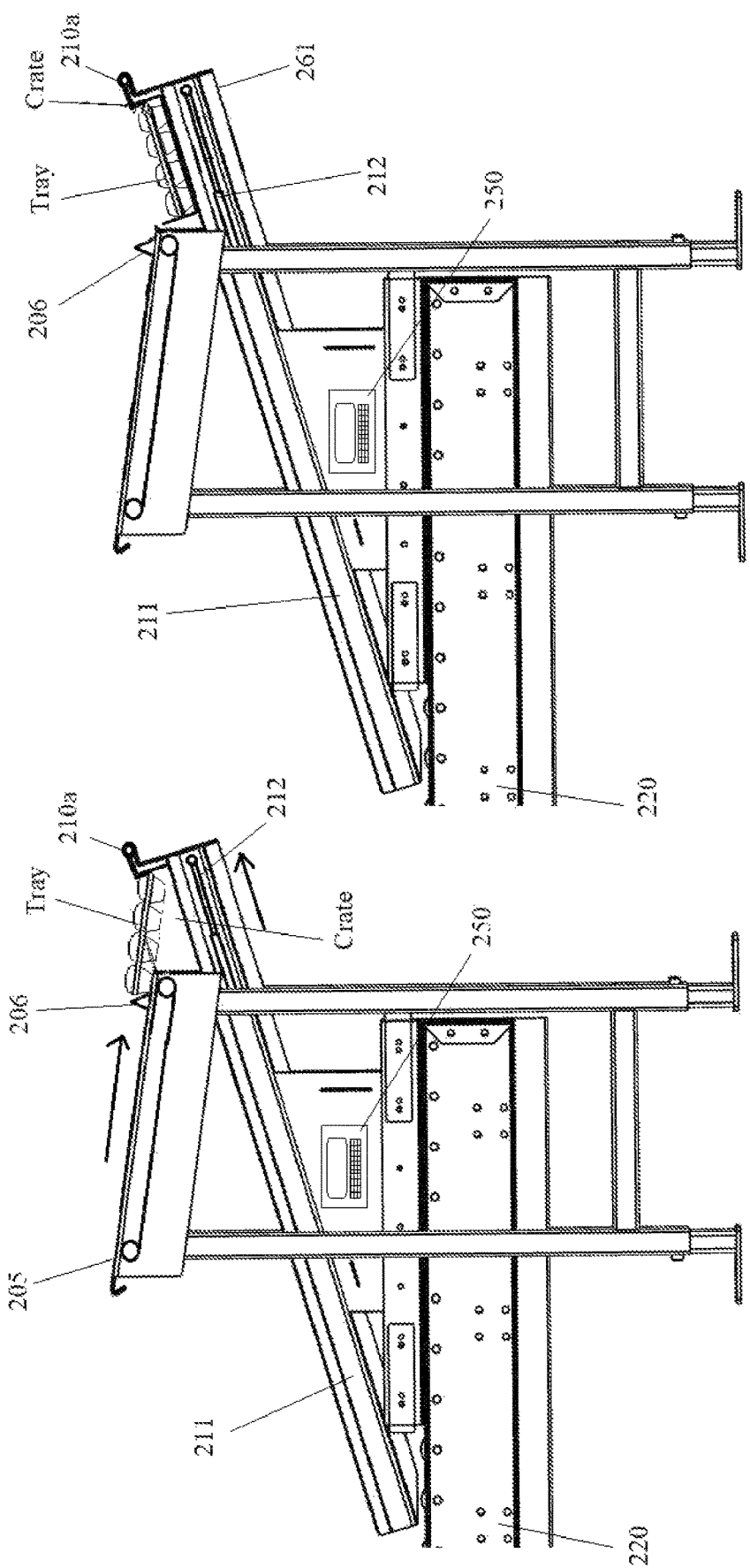

FRUIT TRAY NESTING DEVICE AND METHODS OF USE

This application is a continuation of and claims priority to application of U.S. Application No. 16/953,192, filed Nov. 19, 2020, now US Pat. No. 11,319,099, which claims the benefit of U.S. Provisional Application No. 62/937,744, filed Nov. 19, 2019. The present application claims priority to and incorporates by this reference each of the above-mentioned applications in their entireties.

FIELD OF THE INVENTION

The present invention relates to devices and systems for efficiently positioning fruit trays in packing boxes, and methods for using the same.

DISCUSSION OF THE BACKGROUND

Many fruits and vegetables are packed in special trays that are nested within packing crates. The trays are typically made of a flexible polymeric material having a plurality of cells, each for receiving a piece of fruit or a vegetable. The trays are filled with the fruit or vegetables by specialized packing machines and are then advanced to a loading station for insertion into a crate of complementary perimeter shape.

When the filled trays reach the loading station, the trays bearing the fruit may be delivered into a packing crate by gravity, sliding into the crate from an inclined conveyor into a crate conveyor located below the inclined conveyor. The front portion of a tray may leave the upper inclined conveyor and is deposited in a front zone of the crate. The upper and lower conveyors may move substantially at a same speed in order to coordinate positioning of the trays in the crates. However, such systems often fail to properly deposit the trays properly in the crates due to difficulty in coordinating the tray and crate conveyors and misalignment and/or friction between the trays and the crates.

Thus, conventional fruit tray handling is grossly inefficient, and are in need of improvement. It is therefore desirable to provide novel systems and methods for fruit and vegetable tray packing.

SUMMARY OF THE INVENTION

Embodiments of the present invention provide devices, systems and methods for reliably inserting fruit packing trays into packing crates. Thus, the present invention solves the problems of conventional packaging lines by providing a positioning device for depositing packing trays into packing crates. An advantage of the present invention is that it can be incorporated into existing fruit and vegetable packing lines.

The produce packing system may include produce conveying lines and the produce tray conveying lines thereunder that may converge at a packing zone, so that the fruit is arranged by force of gravity onto the underlying produce trays. The conveying line of the produce trays may continue beyond the packing zone on a nesting conveying line to deliver the filled trays to a nesting station in which the filled trays are installed into packing crates. The nesting line of the filled produce trays aligns and converges with the conveying line of the packing crates at a nesting zone where the filled trays are accurately and reliably nested into the packing crates using the nesting station of the present invention. Thus, the system may have a multi-layer conveying arrangement that allows the filled trays to be delivered to a loading station for insertion into a corresponding crate. For example, a first loading track may receive and transmit filled trays from a tray filling station to the loading station, and a second loading track may transport a crate having a complementary size to the fruit trays to the loading station and/or transmit the crates to a subsequent process station (e.g., a pallet packing station) after the fruit is loaded therein. The upper loading track delivers the produce filled tray to the loading station where it may be positioned on a delivery ramp having a downward slope toward the second loading track.

When the filled trays reach the nesting zone, the filled trays are loaded into a containing crate in a controlled and measured manner where the filled tray is positioned on a first loading track and the corresponding crate is positioned on a second loading track in a crate loading position. The first track may have an inclined angle in order to converge with the underlying second track in which the packing crate is positioned. The filled tray may be actively drawn down the first loading track toward the packing crate while the packing crate is held in static position such that the packing crate does not move until the filled tray contacts the far wall of the packing crate. Both the filled tray and the packing crate are then advanced in the same direction simultaneously such that the filled tray is accurately nested into the packing crate without any skewing or other misalignments.

The first loading track may have a tray guide that is operable to receive a filled produce tray and guide the movement of the filled produce tray along the first loading track. For example, the tray guide may have a track engagement mechanism, such as glides, that movably connects with guides in the first loading track, allowing the track to guide the movement of the tray along the track in both directions. The tray guide may be able to receive a filled tray at a proximal end of the first loading track, where the filled tray is guided into an aligned and snug fit in the track. In some embodiments, the tray guide may include a track having lateral sidewalls that are separate by a distance that is substantially equal to the width of the filled tray. In some embodiments, the tray guide may include a tray follower that engages the trailing end of the tray and advances the tray through the first loading track.

The first loading track guides the filled tray toward a nesting station where the filled tray may be delivered into a crate bed having a complementary shape to that of the filled tray, such that the tray can be snuggly nested therein. The nesting station may include a delivery path for the filled tray to advance into the crate. In some embodiments, the delivery path may include a platform having a distal edge toward which the filled tray is delivered. The leading edge of the filled tray may meet a corresponding edge of the crate at or near the distal edge of the platform. In some embodiments, the platform may include an angled ramp, which may allow the filled tray to move from the first loading track towards a convergence point to meet the crate. The ramp may include a guidance track that maintains the filled tray in the proper orientation such that it is parallel and aligned with the bed of the crate into which it will be deposited.

The crates may be delivered toward the nesting station along the second loading conveyor where the crate is delivered into a nesting caddy that is translatable along a pre-determined path that facilitates the nesting of the filled tray into the crate. In some embodiments, the caddy may be a sliding structure that moves in alternating directions along a caddy track. The caddy may move along the caddy track like a drawer, wherein the leading proximal end of the filled tray meets the corresponding edge of the crate, and then the caddy is drawn outward away from the delivery platform. In some embodiments, the caddy track may pass through track slots or openings in the platform that allow the crate to pass the platform at an angle and in close proximity to the edge of the platform such that the filled tray may be drawn into the crate gently without any significant drop. The slots or openings may be structured such that the platform can rest within the bed of the crate when the caddy is in the initial starting position nearest to the platform such that the leading edge of the filled tray meets the corresponding interior proximal wall of the crate to accurately align and nest the filled tray and the crate. As the caddy is moved along the caddy track away from the delivery platform, the filled tray may be drawn along with crate at the same linear speed either manually or by mechanical device. As a result, the filled tray reliably comes to rest in the crate bed in proper alignment without folding or bunching.

The filled tray may be drawn or pushed with the nesting caddy as it moves along the caddy track away from the delivery platform, such that the filled tray drops into the bed of the crate as the crate caddy moves away from the delivery platform. The filled tray may be drawn manually or by a mechanical device, or may be pushed manually or by a mechanical device (e.g., the tray follower). Once the nesting caddy is fully extended away from the delivery platform, the filled tray may be fully nested in the bed of the crate and the crate may be advanced to a third conveyor for conveyance to a stacking or palleting station for further handling.

In some embodiments, the crate may be delivered to the third conveyor by being advanced in the opposite direction along the caddy track once the caddy is in the fully extended position. Traveling in the opposite direction along the caddy track while the caddy is in the fully extended position may allow the crate to slide toward the third conveyor. In such embodiments, the third conveyor may be located below the delivery platform, the caddy, and/or the first and second loading tracks. In some embodiments, the crate may slide along the caddy track towards the third conveyor by force of gravity. In other embodiments, the crate may be advanced toward the third conveyor along the caddy track manually or by a mechanical device. Due the angle of the caddy track relative to the delivery platform, there is sufficient clearance between the caddy track and the delivery platform when the caddy is in the fully extended position to allow the crate to slide past the delivery platform and onto the third conveyor. This allows for the efficient delivery of the crate from the nesting station to the third conveyor.

In some embodiments, the positioning of the crate into the caddy may be done manually by an operator of the nesting station. The operator may position a crate in the caddy as a filled tray arrives at the delivery platform and the operator may grab the leading edge of the filled tray and draw it to the proximal wall of the box and then draw the caddy crate and tray together such that the tray nests neatly in the bed of the crate. The crate may then be pushed or allowed to slide down the caddy track toward the third conveyor.

In other embodiments, the nesting station may be mechanized, where the crate is delivered to the caddy by automated processes. For example, the second loading conveyor may deliver the crate directly to the caddy into the initial position. In such examples, the caddy assembly may be tilted to receive a crate from the second loading conveyor. In one implementation the caddy may be tilted downward into a horizontal or substantially horizontal position such that it is substantially on the same plane as the second loading conveyor and can receive a crate from the second loading conveyor. Once the crate is positioned in the caddy, the caddy may return to the inclined angle and advance the crate to the starting position in which the distal edge of the delivery platform is positioned against the proximal wall of the crate such that a filled tray may be delivered into the crate.

In such embodiments, the filled tray may be delivered in an automated process. For example, the delivery platform may include a tray-guidance track that guides the filled trays into the appropriate path for delivery into the crate. The delivery platform may further include a mechanical follower that pushes the filled tray toward the proximal wall of the crate. The mechanical follower may be actuated by a chain, belt, or other mechanism that follows a path along the delivery platform, which may be driven by a servo motor or other electrical motor in combination with an encoder, such that the position of the mechanical follower may be known to PLC system or microcontroller operating the automated system. The mechanical follower may advance the filled tray to a predetermined point at which the leading edge of the tray contacts the proximal wall of the crate based on the known dimensions of the tray and the known position of the crate in starting position.

In such embodiments, the caddy may also be operated by an automated system controlled by a PLC system or microcontroller. The caddy may be moved from the initial position to the fully extended position by a chain, belt, or other mechanism that follows the caddy track. The chain, belt, or other mechanism may be driven by a servo motor or other electrical motor in combination with an encoder, such that the position of the caddy may be known to PLC system or microcontroller operating the automated system. The movement of the mechanical follower and the caddy may be coordinated once the mechanical follower positions the leading edge of the tray at the proximal wall of the crate. From these relative positions, the mechanical follower and the caddy may advance at the same speed to deliver the filled tray properly into the bed of the crate.

The apparatus of the present invention may be operable to deliver filled trays into packing crates in succession, thereby providing an automated and efficient tray-nesting process that reduces overall costs of the packing process and effectively and reliably nests the trays in the crates such that packing, stacking and palletizing issues are reduced or prevented.

The invention described above is exemplified by the following exemplary embodiments of the invention, which are intended as examples and do not limit the scope of the invention.

In one aspect, the present invention relates to an apparatus for placing a produce tray in a crate, comprising a guide structure having a track and a crate caddy movable along the track; and a platform for placement of the produce tray, the platform having an incline relative to the track, wherein the pre-determined track underlies the platform and the track has a direction of travel that is parallel to an inclined edge of the platform such that a produce tray may be transferred down the inclined platform toward the crate caddy as the crate caddy moves the crate along the track. The track may pass through the inclined edge of the platform and a portion of the crate caddy passes through the inclined edge of the platform. The inclined platform may include two longitudinal slots through which the track passes. The inclined platform may include two longitudinal slots through which the crate caddy track passes. The crate caddy may be operable to receive a produce crate. The crate caddy may have a receiving niche having a complementary shape to the produce crate. The produce tray may have a perimeter shape that is complementary to a bed of the produce crate. The apparatus may include a grasping mechanism for grabbing a leading edge of the produce tray and a leading wall of the crate and drawing the produce tray into the crate as the caddy moves the crate along the track. The track may be operable to allow the crate to slide back along the track toward a conveyor for delivering the crate to a further handling station.

In another aspect, the present invention relates to an apparatus for placing a produce tray in a crate, comprising a guide structure having a track and a crate caddy movable along the track; and a platform for placement of the produce tray, the platform having an incline relative to the track, wherein the track underlies the platform and the track has a direction of travel that is parallel to an inclined edge of the platform and the inclined platform includes at least one opening aligned with the track. A tray may be transferred down the inclined platform toward the crate caddy as the crate caddy moves the crate along the track and portions of the tray pass through the at least one opening of the platform. The inclined platform may include two longitudinal slots through which are aligned with the track. The inclined platform may include two longitudinal slots through which the crate caddy track passes. The crate caddy may be operable to receive a produce crate. The crate caddy may have a receiving niche having a complementary shape to the produce crate. The produce tray may have a perimeter shape that is complementary to a bed of the produce crate. The apparatus may include a grasping mechanism for grabbing a leading edge of the produce tray and a leading wall of the crate and drawing the produce tray into the crate as the caddy moves the crate along the track. The track may be operable to allow the crate to slide back along the track toward a conveyor for delivering the crate to a further handling station.

In another aspect, the present invention relates to a method of loading a produce tray into a container, comprising placing a container in a container caddy of a guide structure having a track, the container caddy being movable along the track, the container with a bed having a predetermined size and shape therein; propelling the container caddy along the track; propelling a produce tray along a delivery platform having an incline relative to the track, wherein the produce tray has a perimeter shape that is complementary to the receiving niche of the container; and delivering the produce tray accurately into the receiving niche, such that the entire perimeter shape of the produce tray is within the bed of the container. The track may underly the delivery platform and the track has a direction of travel that is parallel to an inclined surface of the platform such that the produce tray may be transferred down the inclined platform and into the bed of the crate as the crate is moved along the track. The track may pass through the inclined surface of the platform and a portion of the track passes through the inclined surface of the platform. The inclined platform may include two longitudinal slots through which the track passes. The inclined platform may include two longitudinal slots through which the crate caddy passes. The crate caddy may be operable to receive a produce crate caddy. The crate caddy may have a receiving niche having a complementary shape to the produce crate. The produce tray may have a perimeter shape that is complementary to a receiving niche of the produce crate. The inclined platform may have a raised edge that is adjacent to a produce tray conveyor for delivering the produce tray to the inclined platform.

Additional objects of the invention will be apparent from the detailed descriptions and the claims herein.

BRIEF DESCRIPTION OF THE DRAWINGS

FIG. 4 shows a side view of the tray nesting system according to the preferred embodiment of the present invention.

FIG. 5 shows a side view of the tray nesting system according to the preferred embodiment of the present invention.

FIG. 6 shows a side view of the tray nesting system according to the preferred embodiment of the present invention.

FIG. 7 shows a side view of the tray nesting system according to the preferred embodiment of the present invention.

FIG. 8 shows a side view of the tray nesting system according to the preferred embodiment of the present invention.

FIG. 9 shows a side view of the tray nesting system according to the preferred embodiment of the present invention.

DETAILED DESCRIPTION

Figure 1:
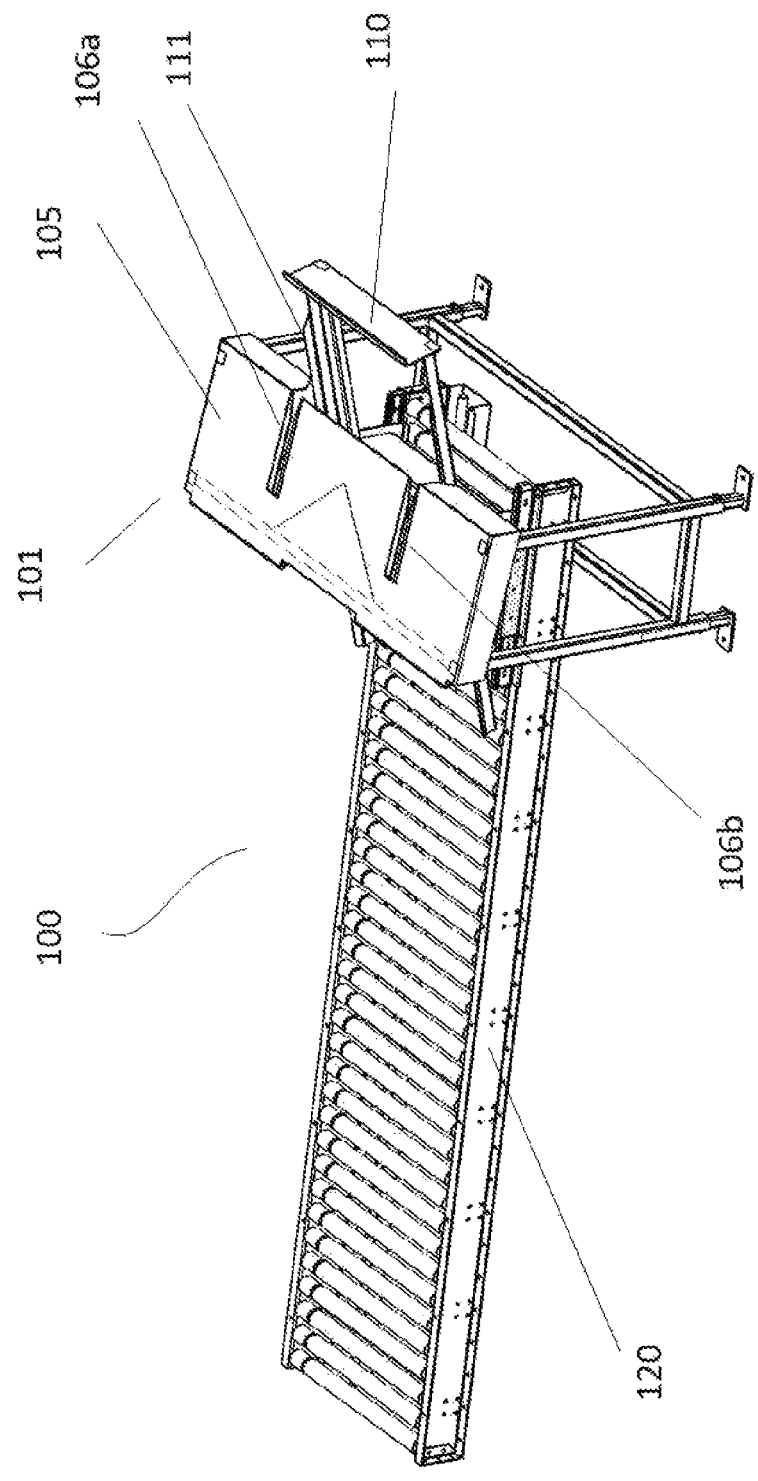
FIG. 1 shows a perspective view of the tray nesting system according to the preferred embodiment of the present invention.

References will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring particularly to FIGS. 1-11, it is seen that the present invention includes various embodiments of the produce packaging systems using the same, and methods of using the same.

Figure 2:
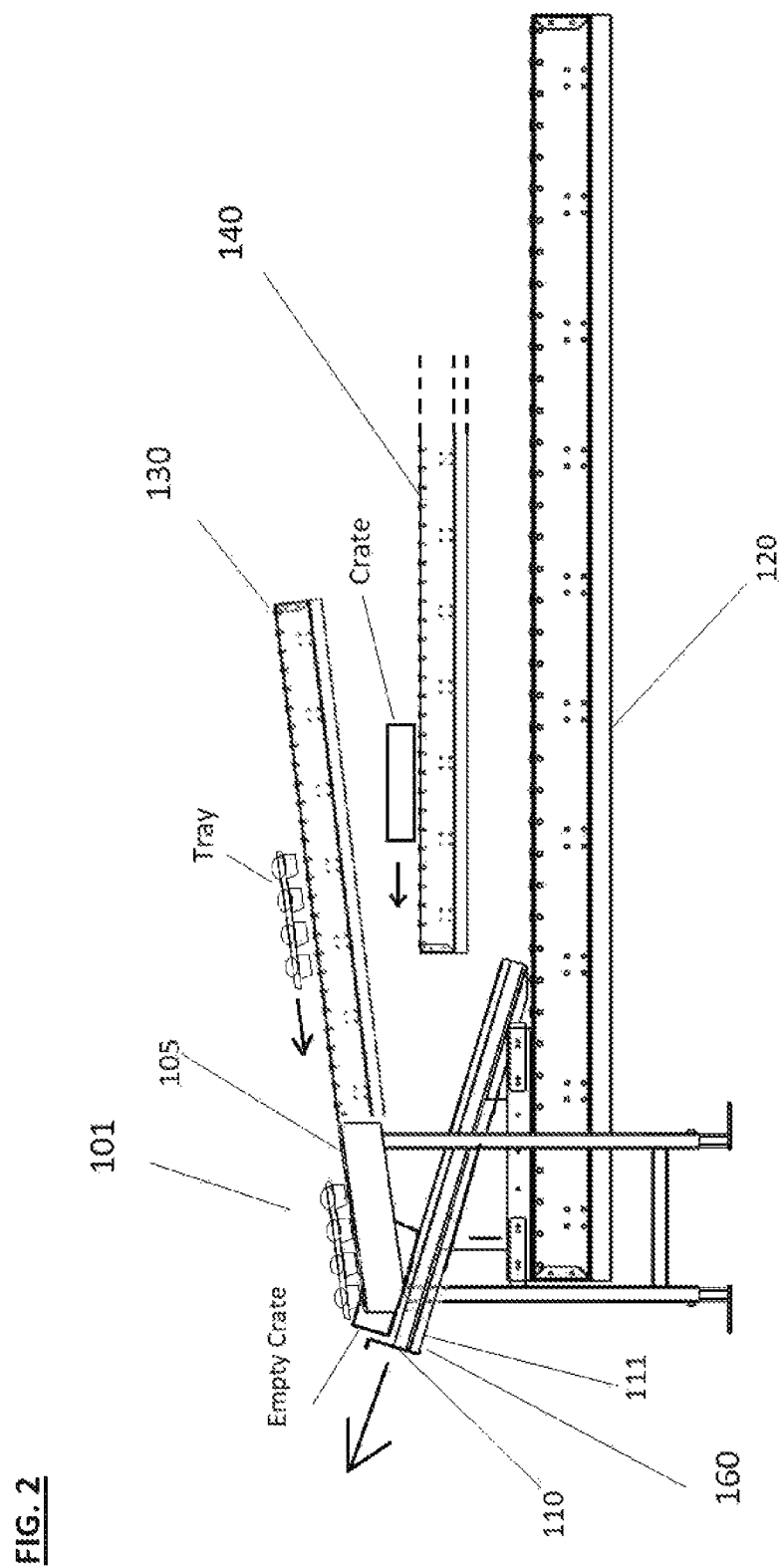
FIG. 2 shows a side view of the tray nesting system according to the preferred embodiment of the present invention.
Figure 3:
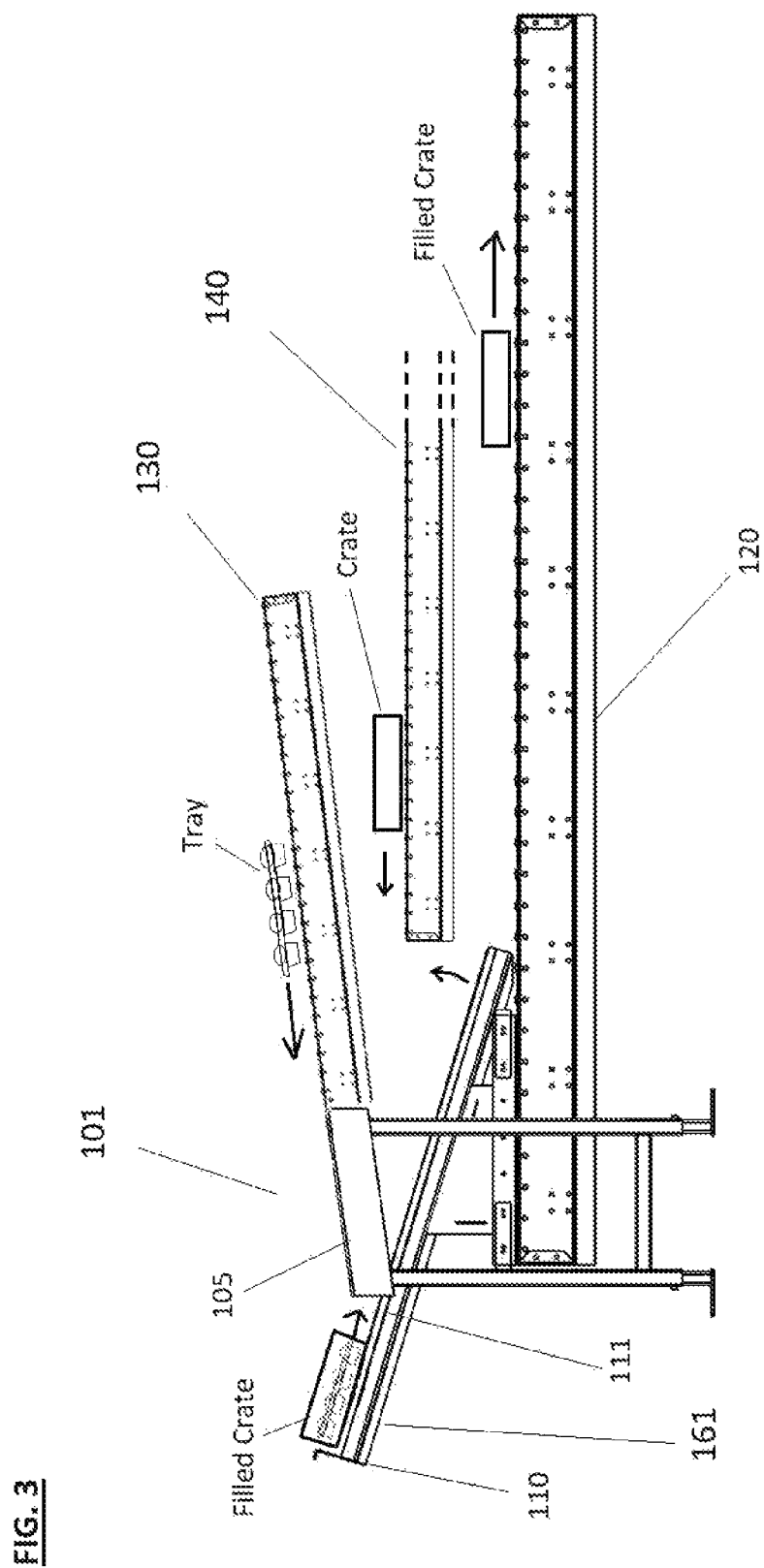
FIG. 3 shows a side view of the tray nesting system according to the preferred embodiment of the present invention.

FIGS. 1-3 provide views of the produce packing system 100 of the present invention. The produce packing system 100 may include a produce tray conveying line 130 to deliver filled produce trays to a nesting station 101 in which the filled trays are installed into packing crates. The tray conveying line 130 of the filled produce trays aligns and converges with the packing crate conveying line 140 at a nesting station 101 where the filled trays are accurately and reliably nested into the packing crates using the nesting station 101. The tray conveying line 130 and crate conveying line 140 converge at the nesting station 101 allowing the filled trays to be delivered to the nesting station 101 for insertion into a corresponding crate. The upper loading track 130 delivers the produce filled tray to the nesting station 101 where it may be positioned on a delivery ramp 105 having a downward slope toward the second loading track 140.

The first loading track 130 may have a tray guide (not shown) that is operable to receive a filled produce tray and guide the movement of the filled produce tray along the first loading track 130. For example, the tray guide may have a track engagement mechanism, such as glides, that movably connects with guides in the first loading track 130, allowing the track to guide the movement of the tray along the track. The tray guide may be able to receive a filled tray at a proximal end of the first loading track 130 or near the nesting station 101, where filled tray is guided into an aligned and snug fit in the track.

The filled tray travels toward a nesting station 101 where the filled tray is to be delivered into a crate bed having a complementary shape to that of the filled tray. The nesting station 101 may include a delivery platform 105 having a distal edge toward which the filled tray is delivered. The leading edge of the filled tray may meet a corresponding edge of the crate at or near the distal edge of the platform 105. In some embodiments, the platform may include an angled ramp, which may allow the filled tray to move from the first loading track toward convergence point to meet the crate. The ramp may include a guidance track that maintains the filled tray in the proper orientation such that it is parallel and aligned with the bed of the crate into which it will be deposited. The delivery platform 105 may include a tray follower that engages the trailing end of the tray and advances the tray through the delivery platform 105 into the crate.

The crates may be delivered toward the nesting station 101 along the second loading conveyor 140 where the crate is delivered into a nesting caddy 110 that is translatable along a pre-determined path that facilitates the nesting of the filled tray into the crate. The caddy 110 may be a sliding structure that moves in alternating directions along a caddy track 111. The caddy 110 may move along the caddy track like a drawer, wherein the leading proximal end of the filled tray meets the corresponding edge of the crate, and then the caddy 110 is drawn outward away from the delivery platform 105. The caddy track 111 may pass through track slots or openings 106a and 106b in the platform 105 that allow the crate to pass across the platform 105 at an angle and in close proximity to the edge of the platform 105 such that the filled tray may be drawn into the crate gently without any significant drop. The slots or openings 106a and 106b may be structured such that the platform 105 can rest within the bed of the crate when the caddy 110 is in the initial starting position nearest to the platform 105 such that the leading edge of the filled tray meets the corresponding interior proximal wall of the crate to accurately align and nest the filled tray and the crate. As the caddy 110 is moved along the caddy track away from the delivery platform 105, the filled tray may be drawn along with crate at the same linear speed either manually or by mechanical device. As a result, the filled tray reliably comes to rest in the crate bed in proper alignment without folding or bunching. The movement of the caddy 110 from a first inserted position 160 in the nesting station to an extended second position 161 is shown in FIGS. 2-3.

When the filled trays reach the nesting zone 101, the filled trays are loaded into a crate in a controlled and measured manner, where the filled tray is positioned on a first loading track 130 and the corresponding crate is positioned on a second loading track 140 in a crate loading position. The filled tray may be actively drawn down the delivery ramp 105 toward the packing crate while the packing crate is held in static position such that the packing crate does not move until the filled tray contacts the far wall of the packing crate, as shown in FIG. 2. Both the filled tray and the packing crate are then advanced in the same direction (as indicated by the arrow in FIG. 2) simultaneously such that the filled tray is accurately nested into the packing crate without any skewing or other misalignments.

When the crate caddy 110 is fully extended from the nesting zone 101, the filled tray is properly nested within the crate. The crate may then be advanced from the crate caddy 110 to the conveyor 120 by sliding in the opposite direction along the caddy track 111. Traveling in the opposite direction along the caddy track 111 while the caddy 110 is in the fully extended position may allow the crate to slide toward conveyor 120. The crate may slide along the caddy track 111 towards the conveyor 120 by force of gravity. In other embodiments, the crate may be advanced toward the conveyor 120 along the caddy track 110 manually or by mechanical device. Due the angle of the caddy track 111 relative to the delivery platform 105, there is sufficient clearance between the caddy track 111 and the delivery platform 105 when the caddy 110 is in the fully extended position to allow the crate to slide past the delivery platform 105 and onto the conveyor 120. This allows for the efficient delivery of the crate from the nesting station 101 to the conveyor 120.

FIGS. 4-11 provide views of the produce packing system 200 wherein the nesting process is automated, according to the present invention. The produce packing system 200 may include a produce tray conveying line 230 to deliver filled produce trays to a nesting station 201 in which the filled trays are installed into packing crates. The tray conveying line 230 of the filled produce trays aligns and converges with the packing crate conveying line 240 at a nesting station 201 where the filled trays are accurately and reliably nested into the packing crates using the nesting station 201. As shown in FIG. 4, the tray conveying line 230 and crate conveying line 240 converge at the nesting station 201 allowing the filled trays to be delivered to the nesting station 201 for insertion into a corresponding crate. The upper loading track 230 delivers the produce filled tray to the nesting station 201 where it may be positioned on a delivery ramp 205 having a downward slope toward the second loading track 240.

The first loading track 230 may have a tray guide (not shown) that is operable to receive a filled produce tray and guide the movement of the filled produce tray along the first loading track 230. For example, the tray guide may have a track engagement mechanism, such as glides, that movably connects with guides in the first loading track 230, allowing the track to guide the movement of the tray along the track. The tray guide may be able to receive a filled tray at a proximal end of the first loading track 230 or near the nesting station 201, where filled tray is guided into an aligned and snug fit in the track.

As shown in FIGS. 5-7, the filled tray travels toward a nesting station 201 where the filled tray is to be delivered into a crate have a bed having a complementary shape to that of the filled tray. The nesting station 201 may include a delivery platform 205 having a distal edge toward which the filled tray is delivered. The leading edge of the filled tray may meet a corresponding edge of the crate at or near the distal edge of the platform 205. In some embodiments, the platform 205 may include an angled ramp, which may allow the filled tray to move from the first loading track toward the convergence point to meet the crate. The ramp 205 may include a guidance track that maintains the filled tray in the proper orientation such that it is parallel and aligned with the bed of the crate into which it will be deposited. The delivery platform 205 includes a tray follower 206 which may be driven by a belt or chain mechanism 207. The tray follower 206 that engages the trailing end of the tray and advances the tray through the delivery platform 205 into the crate.

As shown in FIGS. 8-9, the crates may be delivered toward the nesting station 201 along the second loading conveyor 240 where the crate is delivered into a nesting caddy 210 that is translatable along a pre-determined path that facilitates the nesting of the filled tray into the crate. The caddy 210 may be sliding structure that moves in alternating directions along a caddy track 211. The system 200 may include a caddy actuator 212 (e.g., a hydraulic, electronic, or other linear actuator) that is operable to move the nesting caddy 210 along the caddy track 211. In other embodiments, the caddy actuator may be a chain, belt, or other mechanism may be driven by a servo motor or other electrical motor in combination with an encoder. The caddy 210 may move along the caddy track 211 like a drawer, wherein the leading proximal end of the filled tray meets the corresponding edge of the crate, and then the caddy 210 is drawn outward away from the delivery platform 205. The caddy track 211 may pass through track slots or openings in the platform 205 that allow the crate to pass across the platform 205 at an angle and in close proximity to the edge of the platform 205 such that the filled tray may be drawn into the crate gently without any significant drop (the slots or openings may be like slots 106a and 106b shown in FIG. 1). The slots or openings may be structured such that the platform 205 can rest within the bed of the crate when the caddy 210 is in the initial starting position nearest to the platform 205 such that the leading edge of the filled tray meets the corresponding interior proximal wall of the crate to accurately align and nest the filled tray and the crate. As the caddy 210 is moved along the caddy track away from the delivery platform 205, the filled tray may be drawn along with crate at the same linear speed either manually or by mechanical device. As a result, the filled tray reliably comes to rest in the crate bed in proper alignment without folding or bunching. The movement of the caddy 210 from a first inserted position 260 in the nesting station to an extended second position 261 is shown in FIGS. 7-9.

The mechanical follower 206 and its actuator 207, as well as the caddy actuator 212, may controlled by a controller 250 (e.g., PLC system or other system having a microcontroller). The mechanical follower 206 may advance the filled tray to a predetermined point at which the leading edge of the tray contacts the proximal wall of the crate based on the known dimensions of the tray and the known position of the crate in starting position. The caddy 210 may be moved from the initial position to the fully extended position by caddy actuator 212. The movement of the mechanical follower 206 and the caddy actuator 212 may be coordinated once the mechanical follower 206 positions the leading edge of the tray at the proximal wall of the crate. From these relative positions, the mechanical follower 206 and the caddy actuator 212 may advance at the same speed to deliver the filled tray properly into the bed of the crate.

When the filled trays reach the nesting zone 201, the filled trays are loaded into a crate in a controlled and measured manner, where the filled tray is positioned on a first loading track 230 and the corresponding crate is positioned on a second loading track 240 in a crate loading position. The filled tray may be actively drawn down the delivery ramp 205 toward the packing crate while the packing crate is held in static position such that the packing crate does not move until the filled tray contacts the far wall of the packing crate. Both the filled tray and the packing crate are then advanced in the same direction (as indicated by the arrow in FIG. 2) simultaneously such that the filled tray is accurately nested into the packing crate without any skewing or other misalignments.

The caddy 210 may include a grasping mechanism 210a for grabbing a leading edge of the produce tray and a leading wall of the crate to couple the leading edges of the produce tray and crate together as the caddy 210 moves the crate along track 211. The grasping mechanism 210a may be a pivoting clasp operated by an electrical motor, solenoid, or other electrically activated device that is in electronic communication and under the control of controller 250. The controller may activate the grasping mechanism 210a when the leading edge of the tray meets the leading edge of the crate (e.g., prior to activating actuator 212). The controller 250 may signal the grasping mechanism 210a to retract when the crate caddy 210 is in extended position 261 to allow the nested tray and crate combination to move along track 211 toward conveyor 220, as shown in FIG. 10.

Figure 10:
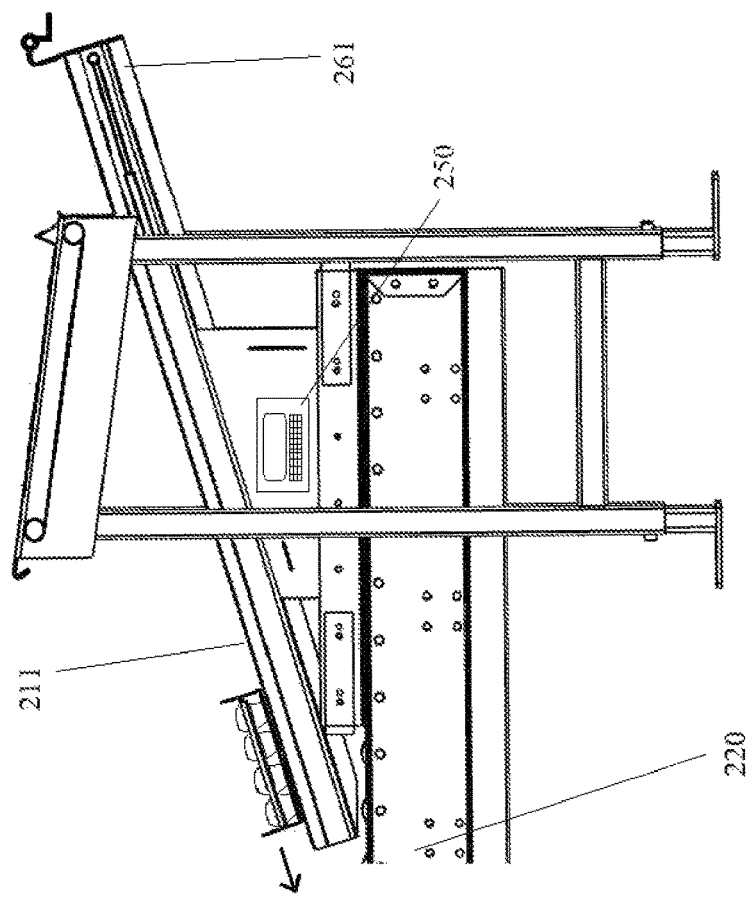
FIG. 10 shows a side view of the tray nesting system according to the preferred embodiment of the present invention.
Figure 11:
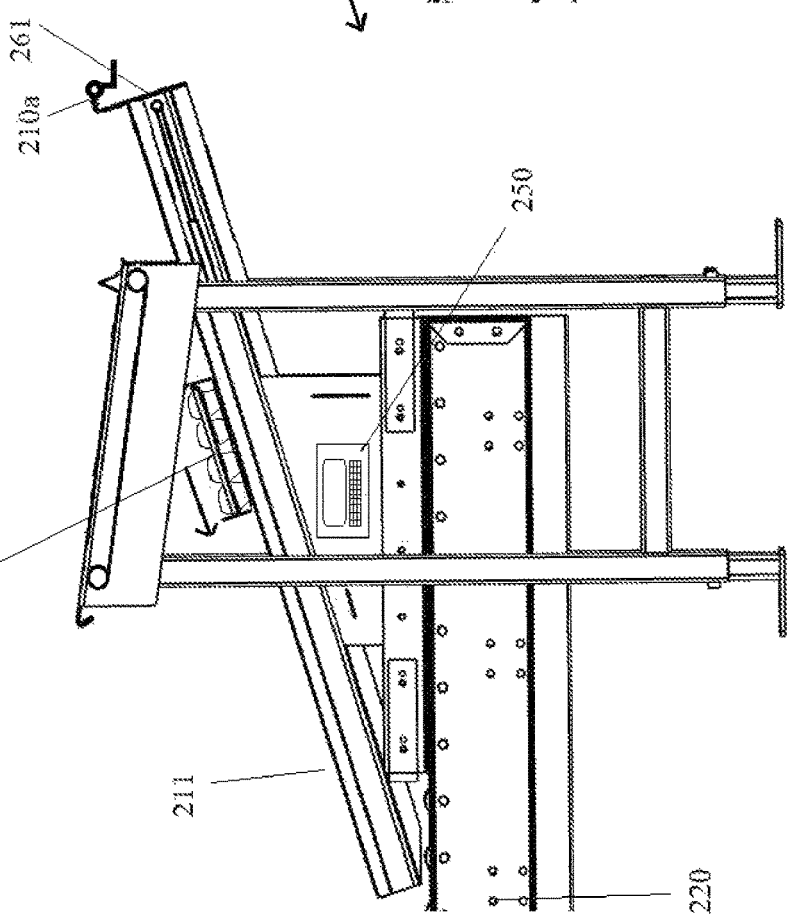
FIG. 11 shows a side view of the tray nesting system according to the preferred embodiment of the present invention.

As shown in FIGS. 10-11, when the crate caddy 210 is fully extended from the nesting zone 201, the filled tray is properly nested within the crate. The crate may then be advanced from the crate caddy 210 to the conveyor 220 by sliding in the opposite direction along the caddy track 211. Traveling in the opposite direction along the caddy track 211 while the caddy 210 is in the fully extended position may allow the crate to slide toward conveyor 220. The crate may slide along the caddy track 211 towards the conveyor 220 by force of gravity. In other embodiments, the crate may be advanced toward the conveyor 220 along the caddy track 210 manually or by mechanical device. Due the angle of the caddy track 211 relative to the delivery platform 205, there is sufficient clearance between the caddy track 211 and the delivery platform 205 when the caddy 210 is in the fully extended position to allow the crate to slide past the delivery platform 205 and onto the conveyor 220. This allows for the efficient delivery of the crate from the nesting station 201 to the conveyor 220.

The present tray nesting system and methods are capable of improved and more efficient tray nested for various commodity goods, including fruits, vegetables, and other tray-packaged goods. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. An apparatus for placing a produce tray in a crate, comprising:
    a. a track and a crate caddy movable along said track; and
    b. a platform for placement of said produce tray,
        wherein said track underlies said platform and said track has a direction of travel such that a produce tray may be transferred from the platform toward the crate caddy as the crate caddy moves the crate along the track, and the track passes through a portion of the platform.

2. The apparatus of claim 1, wherein the platform has an inclined edge and the track passes through the inclined edge of the platform and a portion of the crate caddy passes through the inclined edge of the platform.

3. The apparatus of claim 2, wherein the inclined platform includes two longitudinal slots through which the track passes.

4. The apparatus of claim 1, wherein the inclined platform includes two longitudinal slots through which the crate caddy track passes.

5. The apparatus of claim 1, wherein the crate caddy is operable to receive a produce crate.

6. The apparatus of claim 5, wherein the crate caddy may have a receiving niche having a complementary shape to the produce crate.

7. The apparatus of claim 1, wherein said produce tray has a perimeter shape that is complementary to a bed of said produce crate.

8. The apparatus of claim 1, wherein said track is operable to allow said crate to slide back along the track toward a conveyor for delivering the crate to a further handling station.

9. A method of loading a tray into a container, comprising:
   a. placing a container in a container caddy movable on a track;
   b. propelling said container caddy along said track, wherein a portion of the track passes through a surface of the platform;
   c. propelling a tray along a delivery platform; and
   d. delivering said tray accurately into said container, such that the entire perimeter shape of said tray is within the bed of the container.

10. The method of claim 9, wherein said container has a receiving bed and the tray has a perimeter shape that is complementary to a receiving bed of said container.

11. The method of claim 9, wherein said track underlies said delivery platform and said track has a direction of travel that is parallel to an inclined surface of the platform such that the tray may be transferred down the inclined platform and into the bed of the crate as the crate is moved along the track.

12. The method of claim 9, wherein the platform has an incline relative to said track and the track passes through the inclined surface of the platform.

13. The method of claim 12, wherein the inclined platform includes two longitudinal slots through which the track passes.

14. The method of claim 9, wherein the platform includes two longitudinal slots through which the crate caddy passes.

15. The method of claim 9, wherein the crate caddy is operable to receive a crate caddy.

16. The method of claim 15, wherein the crate caddy may have a receiving niche having a complementary shape to the crate.

17. The method of claim 9, wherein said container has a receiving bed and the tray has a perimeter shape that is complementary to a receiving niche of said crate.

18. A method of loading a tray into a container, comprising:
   a. placing a container in a container caddy movable on a track;
   b. propelling said container caddy along said track in a first direction toward a nesting station;
   c. propelling a tray along a delivery platform in a second direction toward said nesting station to deliver said tray into said container such that the entire tray is within the bed of the container, wherein a portion of the track passes through the delivery platform; and
   d. propelling said container with said tray nested therein along the track in an opposite direction from said first direction toward another station.

19. The method of claim 18, wherein said track underlies said delivery platform and said platform has an inclined surface of the platform such that the tray may be transferred down the inclined platform and into the bed of the crate as the crate is moved along the track.

20. The method of claim 19, wherein the inclined platform includes two longitudinal slots through which the track passes.

21. The method of claim 19, wherein the container caddy has a receiving niche having a complementary shape to the crate.

* * * * *